United States Patent [19]

Nedeljkovic

[11] 3,930,062

[45] Dec. 30, 1975

[54] COMPOSITION AND METHOD FOR ELECTROSTATIC DEPOSITION OF DRY PORCELAIN ENAMEL FRIT

[75] Inventor: Arsenije I. Nedeljkovic, Oak Park, Ill.

[73] Assignee: Eagle-Picher Industries, Inc., Cincinnati, Ohio

[22] Filed: Dec. 4, 1974

[21] Appl. No.: 529,402

[52] U.S. Cl. .................... 427/27; 106/48; 427/376
[51] Int. Cl.² ...................... B05D 1/06; C03C 5/02
[58] Field of Search ........... 427/25, 27, 376; 106/48

[56] References Cited
UNITED STATES PATENTS 3,400,000  9/1968  Hoffman................................. 106/48

*Primary Examiner*—Cameron K. Weiffenbach
*Attorney, Agent, or Firm*—Hill, Gross, Simpson, Van Santen, Steadman, Chiara & Simpson

[57] ABSTRACT

A composition and method for electrostatic deposition of dry porcelain enamel frit wherein the frit is reacted with a flow improving additive consisting of an alkoxysilane, and preferably combined with an adhesion promoting composition consisting of a silazane. Additional benefits are also derived if the sprayed composition also includes a chloro silane.

15 Claims, No Drawings

COMPOSITION AND METHOD FOR ELECTROSTATIC DEPOSITION OF DRY PORCELAIN ENAMEL FRIT

BACKGROUND OF THE INVENTION

1. Field of the Invention

This invention is in the field of electrostatic coating employing particles of porcelain enamel frit, the frit being pretreated so as to reduce its normal caking tendencies and to improve its dry adhesion to the piece prior to firing.

2. Description of the Prior Art

There have been many disclosures in the prior art of the deposition of dry powdered coatings with the aid of an electrostatic field. Many of these disclosures have been directed to the spraying of synthetic resins such as vinyls, epoxies, polyesters, acrylics and the like. The advantages of eliminating air pollution and high utilization of materials make the electrostatic powder coating process using synthetic resins a practical substitute for painting.

Electrically charged powders of plastic coating materials adhere well to the electrically grounded metal. The adherence persists for a matter of hours to days because the powders are good insulators, having a resistivity greater than about $10^{10}$ ohm-cm, thus preventing the charge on the particles from flowing readily into the grounded metal.

The resistivity of porcelain enamel powders at room temperature and at a relative humidity of 50% is in the range of about $10^6$ to $10^8$ ohm-cm. When sprayed on an electrically grounded object, enamel powders behave as though they were conducting materials and the charge on the powder is readily given up to the grounded substrate. As a consequence, electrostatically sprayed enamel powders are repelled away from the metal surface to be coated immediately after deposition. Furthermore, enamel powders are extremely sensitive to agglomeration and caking because of moisture and high humidity.

There is relatively little prior art on the subject of electrostatic coating of porcelain enamels. An article by M. L. Pouiloy appearing in "Finish" magazine of October, 1953 (page 71), concluded that repeated attempts to spray porcelain enamel electrostatically had produced only indeterminate results.

Corbett in his paper entitled "Practical Advantages of the Dry Powder Electrostatic Process", published in the "Vitreous Enameller" for 1973 emphasizes the influence of electrical resistivity on electrostatic spraying of porcelain enamels. According to this article, the electrical resistivity of a powder changes with a change in particle size. Reducing the particle size increases the resistivity and improves the adhesion of the sprayed powder, but reduces the electrostatic deposition efficiency.

One of the few prior art publications which addresses itself to the problem of treating porcelain enamel powders to make them more amenable to electrostatic deposition is German Pat. No. 2,015,072 published Oct. 21, 1971. This publication suggests various additives which might be used in combination with the enamel powder to bring the electrical resistivity to the desired range of $10^{12}$ to $10^{16}$ ohm-cm. In the German patent, there is a suggestion of using alkyl or aryl silanoles, aliphatic, aromatic or hydroaromatic isocyanates, or silicon-nitrogen compounds such as bis(dimethylamino)dimethylsilane or dicyclohexylcarbodiimide.

The prior art has shown that particle size and electrical resistivity of enamel powder are important factors for electrostatic application of porcelain enamels. There is, however, another factor which from a practical standpoint is the most important, i.e., the rate of deposition of the frit powder. Powders with high volume resistivity adhere well to the metal, but the resulting thickness is much below the required thickness of approximately 100 microns (4 mils). Powders having low resistivity can be sprayed quickly, but they do not adhere to the metal. The present invention is directed to the development of a method of preparing powder which has sufficiently high electrical resistivity to adhere to the metal but which can be sprayed at a rate and amount comparable with conventional spraying.

DESCRIPTION OF THE PREFERRED EMBODIMENTS

The present invention provides a method of pretreating borosilicate frit powders to reduce their caking tendencies and to bring their resistivities to the desired range of $10^{12}$ to $10^{16}$ ohm-cm. The anti-caking capability of the composition is provided by reacting the frit in a particulate form with an alkoxysilane having the formula:

$$R_nSi-(OCH_3)_{4-n}$$

where R is a methyl or phenyl group or combinations of these and n is 1 or 2.

The particularly preferred alkoxysilanes for use in the present invention are methyl trimethoxy silane, phenyl trimethoxy silane, and methyl phenyl dimethoxy silane. These are liquid materials which can be combined with the borosilicate frit in an amount of from 0.2 to 0.8% by weight of the mixture, and preferably at about 0.5% to provide an anti-caking property. Apparently the alkoxy silane reacts with water present to form a silanole and to liberate methanol, all according to the following equation:

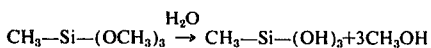
$$CH_3-Si-(OCH_3)_3 \xrightarrow{H_2O} CH_3-Si-(OH)_3 + 3CH_3OH$$

The silanole then presumably reacts with the hydroxyl groups in the glass to improve the electrical resistivity but the net effect of starting with the alkoxy silane is the absorption of water.

Significant improvements in improving the dry adherence of the frit to the substrate are achieved by also treating the frit with an adhesion promoter consisting of a silazane having the following formula:

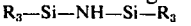
$$R_3-Si-NH-Si-R_3$$

where R is hydrogen or an alkyl radical or an aryl radical, or combinations of alkyl and aryl radicals.

Typically, an amount of 0.05 to 0.5% by weight of the silazane are added, with 0.2% being the optimum.

The addition of 0.05 to 0.50% by weight of the mixture of a silazane such as hexamethyl disilazane to frit powder alone increases the electrical resistivity from $10^7$ ohm-cm to $10^{10}$ to $10^{16}$ ohm-cm depending on the amount of additive added to the powder. The resulting powder can be sprayed onto the metal with very good adhesion. Flow and edge coverage, however, are far from being satisfactory.

Results have shown, however, that when porcelain enamel powders are treated with both alkoxy silanes and silazanes, they exhibit excellent spraying and adhesion properties. By changing the relative amounts of alkoxy silanes and silazanes added to the frit powder, the rate of deposition, adhesion and edge coverage can be adjusted to satisy specific requirements dictated by the size and shape of the object to be sprayed. Powders containing different frits having good adhesion with deposition efficiency comparable with the conventional wet spraying can be produced. Although both additives can be added to the same powder and then mixed into the powder, the best results are obtained when each additive is first mixed into a portion of the frit powder separately, and then the two powders of the same frit containing the two additives are blended.

The best results are obtained when the frit is milled to a fineness of 2–4% remaining on a 200 mesh screen with subsequent screening of the milled powder through a 60 mesh screen. In the resulting powder, 97% of the frit particles are smaller than 74 microns, and 3% of the powder had particles with sizes in the range from 74 to 250 microns. Coarse particles, particularly particles larger than 177 microns improved substantially the rate of deposition and the "wrap around" effect to provide edge and back side coverage.

Both ground coat and cover coat porcelain enamels can be applied by the electrostatic spray powder method. The process of preparing the powder for spraying is essentially the same for all frits; only the optimal quantities of additives need be determined for each group of porcelain enamel frits. The enamel frits can be applied on different grades of sheet iron steel, such as cold rolled steel, enameling iron and decarburized steel, as well as on cast iron, aluminum, or any other metallic substrate. Two or more different frit powders can be applied in sequence, for example, powder of a ground coat sprayed on first, and then a cover coat powder sprayed on over the ground coat. Only one firing is required to fire a multi-layer coating. Powdered frit can also be applied over fired enamel coatings. Practically any shape that is enameled by a conventional method of spraying can be coated by the use of the electrostatic spray powder process. Furthermore, penetration of the powder into sharp recesses or Faraday cages is considerably better with the new process than with the wet electrostatic method.

Good coverage of sharp edges improves corrosion resistance of enameled articles. The gloss and overall appearance of powder sprayed and fired coatings produced according to the present invention are improved noticeably over the gloss and appearance of wet sprayed enamel coatings. The chemical durability in general, and acid resistance in particular, are upgraded with the new method. This results essentially from the elimination of mill additives containing clays and electrolytes. The electrostatic powder process therefore opens new possibilities in the area of porcelain enamel coatings. For example, a two-coat, one fire application of low temperature enamels and the use of less costly steels with a simplified procedure of metal surface preparation are examples of such possibilities.

Additional benefits are derived in terms of improving the deposition rate, if the mixture being sprayed also includes a chloro silane having the following formula:

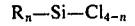
$R_n—Si—Cl_{4-n}$ where R is an alkyl or aryl radical, or combinations of these, and $n$ is 1, 2 or 3, R being preferably a methyl group.

Particularly preferred chloro silanes are methyl-chloro silanes such as monomethyl trichloro silane, dimethyl dichloro silane and trimethyl monochloro silane, added in amounts of about 0.1 to 0.8% by weight of the entire mixture.

Frit powders when treated with chloro silanes display good sprayability and produce coatings of good quality. Chloro silanes in general and methyl chloro silanes in particular are surface active chemicals. In the presence of any moisture (humid air or moisture absorbed by the frit particles) Si—Cl bond of a chloro silane is hydrolyzed with the formation of a silanole. The silanole then reacts with the hydroxyl groups in the glass to improve the electrical resistivity and hydrophobic characteristics of the frit powder. Porcelain enamel frit powders treated with a chloro silane, like the frit powders treated with an alkoxy silane, are less prone to caking because of moisture or humidity. Thus, since chloro silanes and alkoxy silanes impart the same properties to the frit, namely, an anti-caking capability and free flowing characteristics during spraying, a chloro silane could be used as a substitute for the alkoxy silane. The alkoxy silane is, however, preferred because the reaction of the alkoxy silane with moisture releases an alkoxol which is easier to work with than the corrosive and toxic hydrogen chloride which is liberated by hydrolysis or chloro silanes. An addition of a chloro silane to the frit in amounts of up to 1% by weight does not generate significant corrosion or pollution problems. Nevertheless, it is suggested that an alkoxy silane be primarily used as an additive for anti-caking and free flowing properties. When a chloro silane is added to frit powder already treated with an alkoxy silane and a silazane, additional benefits are derived in terms of improving the depositon rate and the resistance of sprayed powder against blowing off. The beneficial role of chloro silanes in improving the cohesive binding strength of the powder and its resistance against blowing off is extremely important, particularly when powder coated products are fired in a continuous furnace.

The additives provided herein are normally liquid compounds which help to fluidize the porcelain enamel frit particles in the suspending air stream as the air stream is passing through the gun. They are also easily driven off during drying of the bisque coating, and firing of the coated piece. The compositions of the present invention are usable under normal conditions of electrostatic coating, namely, at direct current potentials ranging from about 40,000 to 100,000 volts.

EXAMPLE 1

A porcelain enamel frit was milled in a ball mill to a fineness of 5% remaining on a 200 mesh screen. After screening through a 60 mesh screen, an amount of methyl trimethoxy silane equivalent to 0.5% of the total mixture was added to a portion of the powder, and an amount of hexamethyl disilazane equivalent to 0.15% of the total mixture was added to another portion of the milled and screened frit. The two portions of the treated powder were then blended, and mixed in a mixer for 30 minutes.

The frit powder with the additives was sprayed on an electrically grounded object by using a DeVilbiss EHP-600 manual powder spray system. The spraying parameters were adjusted to give optimum sprayability and deposition efficiency. Typical settings for spraying a 60 by 60 cm (approximately 24 by 24 in.) piece were as follows:

| | | |
|---|---|---|
| Main air | 55 psi | (3.7 atm) |
| Fluidizing air | 2 psi | (0.1 atm) |
| Material feed | 300 g/min at | 18 psi (1.2 atm) |
| Vortex air | 20 psi | (1.4 atm) |
| Voltage | 70 KV | |

Powder coated samples were fired either in box furnaces or continuous enameling furnaces. With frit powders prepared as described above, no adhesion problems were experienced when the powder coated panels were transferred from the spraying booth to the furnace. After firing, the quality of the coatings was evaluated by employing standard test methods used in evaluating conventionally applied porcelain enamel coatings. These included thickness, uniformity, fired adherence, color characteristics, and chemical resistance.

EXAMPLE 2

A typical ground coat porcelain enamel frit was made up of the following approximate composition:

| | | |
|---|---|---|
| $SiO_2$ | 38% | by weight |
| $Na_2O$ | 17 | " |
| $K_2O$ | 4 | " |
| $Li_2O$ | 1 | " |
| CaO | 7 | " |
| BaO | 6 | " |
| $Al_2O_3$ | 2 | " |
| $B_2O_3$ | 17 | " |
| $P_2O_5$ | 1 | " |
| $TiO_2$ | 1 | " |
| NiO | 1 | " |
| CoO | 0.5 | " |
| CuO | 0.7 | " |
| $MnO_2$ | 0.5 | " |
| $F_2$ | 3.3 | " |

The frit was milled to a fineness of 5% retention on a 200 mesh screen and was then screened through a 60 mesh screen. The resistivity of the powder was $2 \times 10^7$ ohm-cm. To this powder was added 0.6% of methyl trimethoxy silane and 0.3% of hexamethyl disilazane. The resistivity of the resulting powder was $5.8 \times 10^{13}$ ohm-cm. The powder was sprayed on suitably prepared substrates at an application weight of 250 g/m² (23 g/ft²) and then fired at 770°C (approximately 1420°F) for 3½ minutes. The size of the parts sprayed with the powder ranged from simple flat pieces measuring 10 × 10 cm (4 × 4 in.) to a dishwasher tub. The resulting coating had a high gloss, excellent edge coverage, uniform thickness of 100 microns (4 mils) and good adherence. Powder stored for a period longer than one month had spraying and adhesion characteristics of freshly prepared powder.

EXAMPLE 3

A titania opacified cover coat frit was prepared having a composition as follows:

| | | |
|---|---|---|
| $SiO_2$ | 42% | by weight |
| $Na_2O$ | 9 | " |
| $K_2O$ | 7 | " |
| $Li_2O$ | 1 | " |
| $B_2O_3$ | 16 | " |
| $P_2O_5$ | 1 | " |
| $TiO_2$ | 20 | " |
| $ZrO_2$ | 1 | " |
| $F_2$ | 3 | " |

This frit was milled to a fineness of 4.5% retention on a 200 mesh screen and was then screened using a 60 mesh screen. Approximately 0.5% of methyl trimethoxy silane and 0.2% hexamethyl disilazane were added to the powder. Frit powder treated with these two additives had a resistivity of $6.2 \times 10^{12}$ ohm-cm, while powder with the same frit composition containing no additives had a resistivity of $5.0 \times 10^7$ ohm-cm. A suitably prepared enameling grade steel was sprayed with the treated powder at an application weight of 250 g/m² (23 g/ft²). A wide range of parts with different shapes and sizes was used as a substrate. These included the inside surfaces of a dishwasher tub and rather complicated outside surfaces of a dishwasher door. The enamel was fired at 790°C (approximately 1450°F) for 3½ minutes. The resulting coating had an improved gloss and a smoother surface than a corresponding wet sprayed coating. Edge coverage, acid resistance, and color were improved noticeably when compared with the same enamel applied by conventional spraying.

EXAMPLE 4

A ground coat powder and a titania cover coat powder were prepared as in the procedures described in the previous examples. An enameling grade steel was cleaned and pickled, and then the ground coat powder was sprayed to give a weight of application of 100 g/m² (9.3 g/ft²). A cover coat powder was sprayed as a second coating layer with an application weight of 250 g/m² (23 g/ft²) and then both enamel powders were fired at 790°C (approximately 1450°F) for 3½ minutes. This system, consisting of two coats with one firing, although applied over the steel without the conventional nickel flash coating, developed good adherence, and improved gloss, and a smoother surface.

EXAMPLE 5

A titania opacified cover coat frit having a composition as set forth in Example 3 was milled to a fineness of 3.5% retention on a 200 mesh sieve. After screening through a 60 mesh screen, an amount of methyl trimethoxy silane equivalent to 0.3% of the total mixture and an amount of hexamethyl disilazane equivalent to 0.2% of the total mixture were added to a portion of the powder. An amount of dimethyl dichloro silane equivalent to 0.2% of the total mixture was added to another portion of the milled and screened frit. The two portions of the treated powder were then blended, and mixed in a mixer for 30 minutes. The electrical resistivity of the resulting powder was $4.6 \times 10^{14}$ ohm-cm. The treated powder was sprayed on suitably prepared enameling grade steel at an application weight of 250 g/m² (23 g/ft²) and then fired at 790°C (approximately 1450°F) for 3½ minutes. The fired coating had a high gloss, excellent edge coverage, uniform thickness of about 100 microns (4 mils) and good adherence. The powder treated with the three additives displayed good deposition efficiency and dry adhesion, as well as good resistance to air flow of relatively high velocity, such as the air currents in an air curtain located at the entrance door of a typical continuous enameling furnace.

It should be evident that various modifications can be made to the described embodiments without departing from the scope of the present invention.

I claim as my invention:

1. The method of electrostatically spraying a porcelain enamel frit which comprises reacting said frit with an alkoxysilane having the formula:
   $R_n—Si—(OCH_3)_{4-n}$
where R is a methyl or phenyl group or combinations of these and n is 1 or 2, and thereafter electrostatically spraying the reacted frit onto a substrate.

2. The method of claim 1 in which said alkoxysilane is methyl trimethoxy silane.

3. The method of claim 1 in which said alkoxysilane is phenyl trimethoxy silane.

4. The method of claim 1 in which said alkoxysilane is methyl phenyl dimethoxy silane.

5. The method of claim 1 in which said alkoxysilane is present in an amount of from 0.2 to 0.8% by weight of the mixture.

6. The method of claim 1 in which said frit consists of particles of a borosilicate glass.

7. The method of claim 1 in which the mixture electrostatically sprayed also includes silazane having the formula:

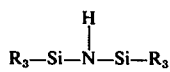

where R is an alkyl radical or an aryl radical, or a combination of these.

8. The method of claim 7 in which the sprayed mixture has a particle size such that it is all less than 60 mesh, and from 2 to 4% is larger than 200 mesh.

9. The method of claim 7 in which said silazane is hexamethyl disilazane.

10. The method of calim 7 in which said silazane is included in an amount of from 0.05 to 0.5% by weight of the mixture.

11. The method of claim 7 in which the sprayed mixture also includes a chloro silane having the formula:
$$R_n-Si-Cl_{4-n}$$
where R is an alkyl or aryl radical, or a combination of these, and $n$ is 1, 2 or 3.

12. The method of claim 11 in which said chloro silane is a methyl chloro silane.

13. A composition for deposition by electrostatic spraying comprising a particulate porcelain enamel frit combined with a caking reducing amount of an alkoxysilane having the formula:
$$R_n-Si-(OCH_3)_{4-n}$$
where R is a methyl or phenyl group or combinations of these and $n$ is 1 or 2.

14. The composition of claim 13 which also includes an amount of a silazane effective to bring the resistivity of the composition into the range of $10^{12}$ to $10^{16}$ ohm-cm, said silazane having the formula:

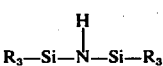

where R is an alkyl radical or an aryl radical, or combinations of these.

15. The composition of claim 14 which also includes a chloro silane having the formula:
$$R_n-Si-Cl_{4-n}$$
where R is an alkyl or aryl radical or combinations of these, and $n$ is 1, 2 or 3.

* * * * *